US012083794B2

(12) United States Patent
Takeda

(10) Patent No.: US 12,083,794 B2
(45) Date of Patent: Sep. 10, 2024

(54) INKJET PRINTER PROVIDED WITH CIRCUIT GENERATING DRIVE VOLTAGE FOR EJECTION ELEMENT BY MOVEMENT OF CARRIAGE

(71) Applicant: BROTHER KOGYO KABUSHIKI KAISHA, Nagoya (JP)

(72) Inventor: Michihiro Takeda, Kiyosu (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 256 days.

(21) Appl. No.: 17/586,558

(22) Filed: Jan. 27, 2022

(65) Prior Publication Data

US 2022/0242114 A1 Aug. 4, 2022

(30) Foreign Application Priority Data

Jan. 29, 2021 (JP) ................................ 2021-013951

(51) Int. Cl.
*B41J 2/045* (2006.01)
*B41J 29/393* (2006.01)

(52) U.S. Cl.
CPC ....... *B41J 2/04581* (2013.01); *B41J 2/04541* (2013.01); *B41J 29/393* (2013.01)

(58) Field of Classification Search
CPC .. B41J 2/04581; B41J 2/0458; B41J 2/04586; B41J 2/175; B41J 2/30; B41J 2/04541; B41J 29/38; B41J 19/142; H02K 41/031
See application file for complete search history.

(56) References Cited

U.S. PATENT DOCUMENTS 4,012,676 A * 3/1977 Giebler .............. H02K 41/0356 400/322
4,604,633 A * 8/1986 Kimura ................ B41J 2/17566 250/231.19
5,099,383 A * 3/1992 Fukano ...................... B41J 2/30 400/157.2
2002/0008722 A1* 1/2002 Imanaka ................ B41J 19/202 347/14
2018/0178545 A1* 6/2018 Yoshigai .................... B41J 9/48

FOREIGN PATENT DOCUMENTS

JP 2011-103723 A 5/2011

* cited by examiner

*Primary Examiner* — John Zimmermann
(74) *Attorney, Agent, or Firm* — Baker Botts L.L.P.

(57) ABSTRACT

An inkjet printer includes a head, a drive voltage generating circuit, a carriage, and a magnet array. The head includes a nozzle and an ejection element. The ejection element is configured to be driven, when applied with a drive voltage, to eject ink from the nozzle. The drive voltage generating circuit is configured to generate the drive voltage to be applied to the ejection element. The carriage is configured to move in a moving direction to move the head and the drive voltage generating circuit in the moving direction. The magnet array includes a plurality of magnets arrayed in the moving direction. The drive voltage generating circuit includes a coil configured to produce an electromotive force by interlining with magnetic flux of the magnet array in accordance with movement of the carriage. The drive voltage generating circuit generates the drive voltage using the electromotive force produced by the coil.

15 Claims, 9 Drawing Sheets

INKJET PRINTER PROVIDED WITH CIRCUIT GENERATING DRIVE VOLTAGE FOR EJECTION ELEMENT BY MOVEMENT OF CARRIAGE

CROSS REFERENCE TO RELATED APPLICATIONS

This application claims priority from Japanese Patent Application No. 2021-013951 filed Jan. 29, 2021. The entire content of the priority application is incorporated herein by reference.

BACKGROUND

Conventionally, there has been known an inkjet printer having a head unit supported in a carriage. The carriage is supported by a carriage shaft so as to be capable of reciprocating while the head unit ejects ink to print an image on a recording medium. A power generator is disposed on the carriage. The power generator is provided with a gear, and a power generation motor. A rack gear is disposed on the carriage shaft. When the carriage moves outside the printing area, the gear in the power generator meshingly engages with the rack gear to stop the carriage. Braking energy obtained in the process of the carriage stopping rotates the gear, which in turn rotates the power generation motor, enabling the motor to generate power. The power generated by the motor is used for driving the head unit.

SUMMARY

However, an alternative technique to the above-described conventional technique has been desired for achieving power-saving.

In view of the foregoing, it is an object of the present disclosure to provide an inkjet printer that can achieve power-saving in a different manner from the conventional technique.

In order to attain the above and other object, according to one aspect, the present disclosure provides an inkjet printer including a head, a drive voltage generating circuit, a carriage, and a magnet array. The head includes a nozzle and an ejection element. The ejection element is configured to be driven, when applied with a drive voltage, to eject ink from the nozzle. The drive voltage generating circuit is configured to generate the drive voltage to be applied to the ejection element. The carriage is configured to move in a moving direction to move the head and the drive voltage generating circuit in the moving direction. The magnet array includes a plurality of magnets arrayed in the moving direction. The drive voltage generating circuit includes a coil configured to produce an electromotive force by interlining with magnetic flux of the magnet array in accordance with movement of the carriage. The drive voltage generating circuit generates the drive voltage using the electromotive force produced by the coil.

In the above inkjet printer, a drive voltage is generated from electromotive force induced in the coil while the carriage moves, and the ejection element can be driven through the application of this drive voltage, whereby power-saving can be achieved.

The above inkjet printer may be implemented by a computer. In this case, the computer is controlled to operate as each component of the inkjet printer (software elements). Accordingly, a print control program for the inkjet printer used to implement the inkjet printer on the computer and a non-transitory computer-readable storage medium storing this program fall within the scope of the present disclosure.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

Embodiment

Hereinafter, an inkjet printer 1 according to an embodiment of the present disclosure will be described with reference to FIGS. 1 through 9. For convenience, the top, bottom, left side, and right side, of the inkjet printer 1 in FIG. 1 will be referred to in the following description as the top, bottom, rear side, and front side, respectively.

<Overall Structure of the Inkjet Printer 1>

The inkjet printer 1 is a multifunction peripheral provided with a printer section and a scanner section and has a plurality of functions, such as a scan function, a print function, a copy function, and a facsimile function. The print function of the inkjet printer 1 employs an inkjet printing system for recording images on sheets P based on print data by ejecting ink. The sheets P are an example of the recording medium. The printer section is connected primarily to computers or other external information devices. The printer section records images and characters on a recording medium based on print data received from an external information device. This print data includes image data and document data, for example. The scanner section is configured of a flatbed scanner 42. Since the configuration of the scanner section in the present disclosure is arbitrary, the present specification omits any description of structures relating to operations of the scanner section. Additionally, the inkjet printer 1 may be a printer having only a print function.

Figure 1:
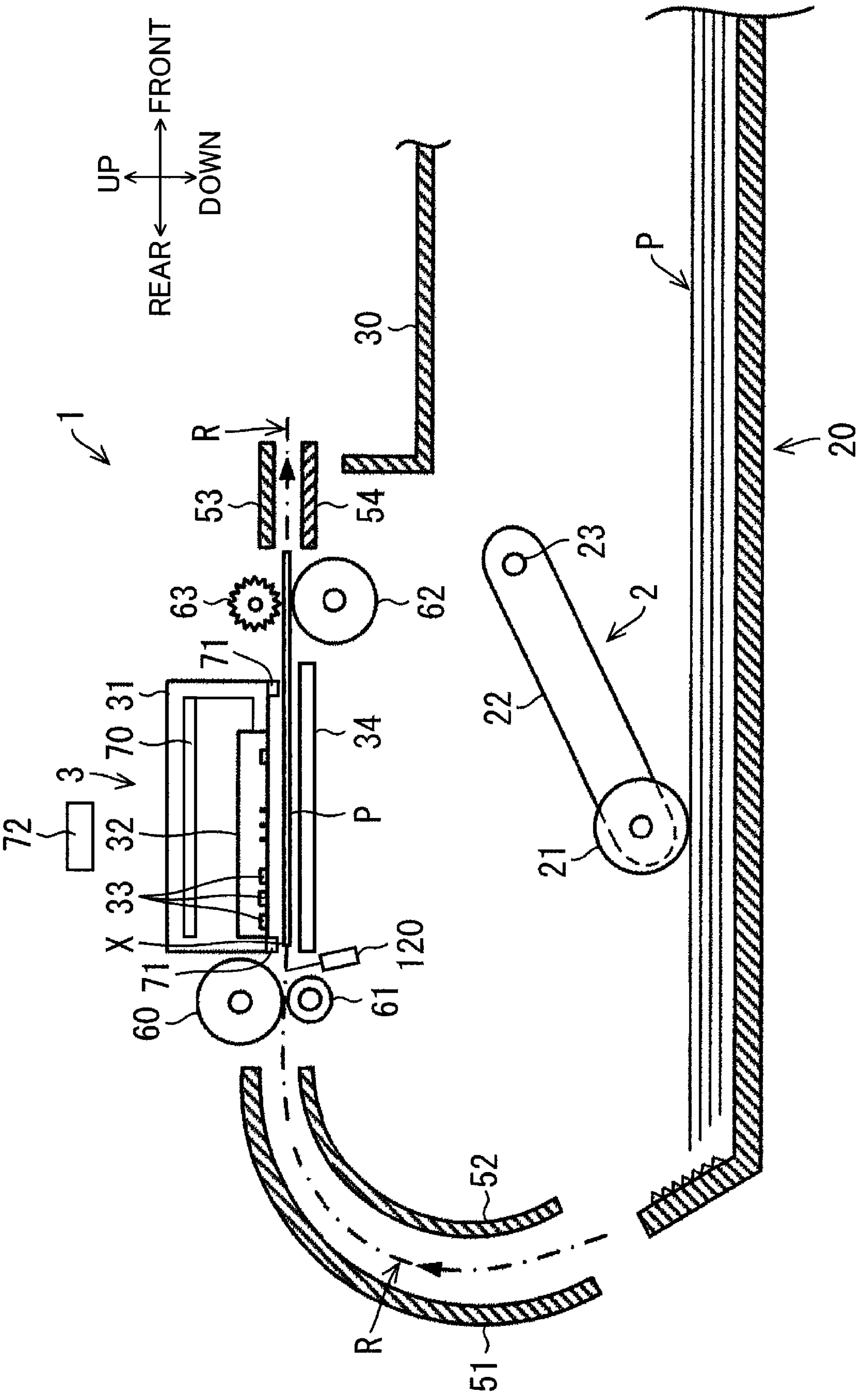
FIG. 1 is a partially cross-sectional view illustrating the internal structure of an inkjet printer.

As shown in FIG. 1, the inkjet printer 1 is provided with a feed tray 20, a feed unit 2, a conveying roller 60, an image-recording unit 3, a discharge roller 62, and a discharge tray 30. The feed tray 20 has a box shape and is open on the top. The feed tray 20 can move in the front-rear direction through an opening formed in the front side of the inkjet printer 1. The feed tray 20 accommodates a plurality of sheets P in a stacked state. Note that the sheets P may be a paper medium or a resin medium such as transparency sheets, for example.

The feed unit 2 has a feed roller 21, a feed arm 22, and a shaft 23. Through a forward rotation of the feed roller 21, the feed unit 2 feeds sheets P accommodated in the feed tray 20 onto a conveying path R. The feed roller 21 is rotatably supported on the distal end of the feed arm 22. The feed arm 22 is pivotably supported on the shaft 23, which in turn is supported by a frame of the inkjet printer 1. The feed arm 22 is urged to pivot toward the feed tray 20 by its own weight or an elastic force generated through a spring or the like. The inkjet printer 1 is also provided with a motor 102 shown in FIG. 2. A drive force produced by reverse rotation of the motor 102 is transmitted to the feed roller 21 for rotating the feed roller 21 forward.

The conveying path R refers to space formed by guide members 51 and 52, the image-recording unit 3, guide members 53 and 54, and the like. The conveying path R extends upward from the rear end of the feed tray 20, curves in the region defined by the guide members 51 and 52, and then extends straight past the position of the image-recording unit 3 and through the region defined by the guide members 53 and 54 until reaching the discharge tray 30.

The conveying roller 60 is disposed along the conveying path R upstream of the image-recording unit 3 in the conveying direction. A pinch roller 61 is disposed at a position facing the bottom portion of the conveying roller 60. The conveying roller 60 is driven to rotate by the motor 102. The pinch roller 61 rotates in accordance with the rotation of the conveying roller 60. While a sheet P is nipped between the conveying roller 60 and pinch roller 61, the forward rotation of the conveying roller 60 and pinch roller 61 conveys the sheet P to an image-recording position X on the conveying path R. The image-recording position X is the position at which a recording head 32 (described later) records an image on the sheet P. A drive force generated by forward rotation of the motor 102 is transmitted to the conveying roller 60 by a drive transmission mechanism (not shown) for rotating the conveying roller 60 forward. A drive force generated by reverse rotation of the motor 102 is transmitted to the conveying roller 60 for rotating the conveying roller 60 in reverse.

The image-recording unit 3 is disposed on the conveying path R between the conveying roller 60 and the discharge roller 62. The image-recording unit 3 includes a carriage 31, a recording head 32, a plurality of nozzles 33, a coil 70, metal guides 71, a magnet array 72, and a platen 34.

Figure 2:
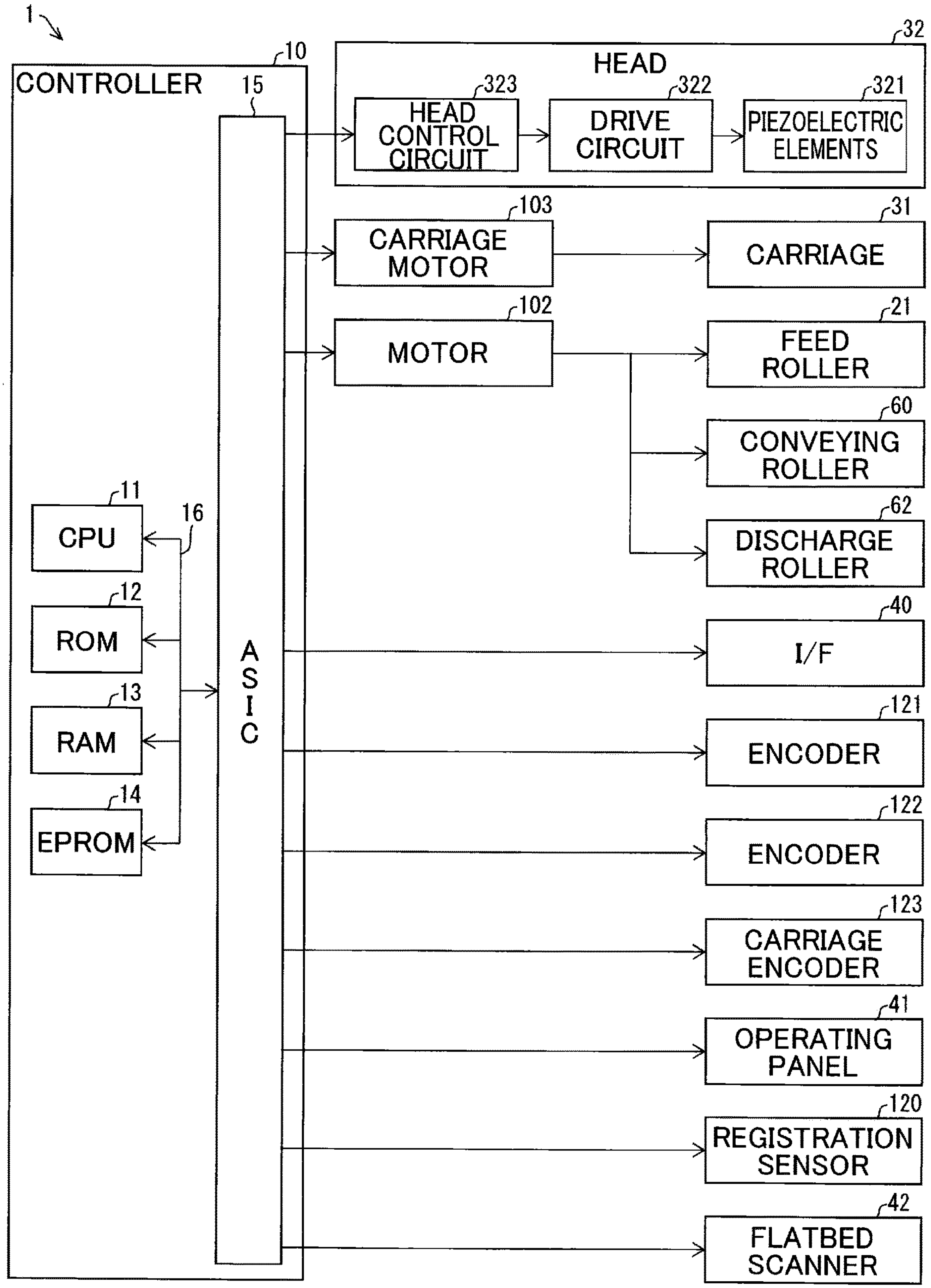
FIG. 2 is a block diagram illustrating the system configuration of the inkjet printer.

The inkjet printer 1 is also provided with a carriage motor 103 shown in FIG. 2. The drive force of the carriage motor 103 is transmitted to the carriage 31 for reciprocating the carriage 31 on the metal guides 71 in directions orthogonal to the conveying direction, and specifically along the width direction of the sheet P.

As shown in FIG. 1, the recording head 32 and coil 70 are mounted on the carriage 31. The nozzles 33 are formed in the bottom surface of the recording head 32. The recording head 32 ejects ink droplets from the nozzles 33 by vibrating piezoelectric elements 321. The piezoelectric elements 321 are an example of the ejection elements. The magnet array 72 is arranged above the carriage 31 and produces magnetic fluxes. The magnetic fluxes link with the coil 70 to induce electromotive force. This electromotive force is used for generating drive voltages to drive piezoelectric elements 321 inside the recording head 32. The platen 34 is a rectangular plate-shaped member that supports sheets P. The recording head 32 records an image on a sheet P supported on the platen 34 by selectively ejecting ink droplets while the carriage 31 is moved.

A carriage encoder 123 (see FIG. 2) is disposed on the carriage 31. The carriage encoder 123 is a linear encoder that outputs an encoder signal based on displacement of the carriage 31 in the width direction of the sheet P. The carriage encoder 123 is provided with an encoder scale and an optical sensor (not shown). The encoder scale is disposed on a frame supporting the carriage 31 and extends along the width direction of the sheets P. The optical sensor is mounted on the carriage 31. The carriage encoder 123 inputs into a controller 10 (described later with reference to FIG. 2) an encoder signal based on changes in relative positions of the encoder scale and optical sensor.

The discharge roller 62 is disposed along the conveying path R downstream of the image-recording unit 3 in the conveying direction. A spur roller 63 is disposed at a position facing the upper porting of the discharge roller 62. The spur roller 63 is an example of the conveying portion. The discharge roller 62 is driven to rotate by the motor 102. The spur roller 63 rotates in accordance with the rotation of the discharge roller 62. By the forward rotation of the discharge roller 62 and spur roller 63, a sheet P is nipped between the discharge roller 62 and spur roller 63 and is discharged into the discharge tray 30.

The discharge tray 30 is arranged above the feed tray 20. The discharge tray 30 supports sheets P discharged by the discharge roller 62.

As shown in FIG. 1, a registration sensor 120 is also disposed on the conveying path R between the conveying roller 60 and the image-recording unit 3. The registration sensor 120 detects sheets P passing the contact position on the conveying path R at which sheets P contact the conveying roller 60. The registration sensor 120 may be a sensor provided with an actuator that pivots when contacted by a sheet P, a photosensor, or the like. The registration sensor 120 outputs an ON signal while a sheet P is passing the contact position of the sheet P and conveying roller 60 and outputs an OFF signal when a sheet P is not passing this contact position. Detection signals from the registration sensor 120 are outputted to the controller 10.

An encoder 121 (see FIG. 2) is provided on the conveying roller 60 for detecting the rotation of the conveying roller 60. The encoder 121 outputs a pulse signal to the controller 10 based on the rotation of the conveying roller 60. Specifically, the encoder 121 has an encoder disc, and an optical sensor (not shown). The encoder disc rotates along with the rotation of the conveying roller 60. The optical sensor generates a pulse signal while reading the rotating encoder disc and outputs the generated pulse signal to the controller 10.

An encoder 122 (see FIG. 2) is provided on the feed roller 21 for detecting the rotation of the feed roller 21. The encoder 122 has the same construction as the encoder 121 and outputs a pulse signal to the controller 10 based on the rotation of the feed roller 21.

<System Configuration of the Inkjet Printer 1>

FIG. 2 is a block diagram showing the system configuration of the inkjet printer 1 according to the present embodiment.

As shown in FIG. 2, the controller 10 includes a central processing unit (CPU) 11, a read-only memory (ROM) 12, a random-access memory (RAM) 13, an electrically erasable programmable read-only memory (EEPROM) 14, and an application-specific integrated circuit (ASIC) 15. Note that "EEPROM" is a Japanese registered trademark of Renesas Electronics Corporation. Through a bus 16, these components are connected to and capable of exchanging data with the printer section, scanner section, and an operating panel 41 (described later). The ROM 12 stores programs and the like for controlling the CPU 11 to execute various operations. The RAM 13 is used as a storage area for temporarily storing data, signals, and the like used when the CPU 11 executes the programs, or as a work area for data processing. The EEPROM 14 stores settings information that must be preserved after power to the inkjet printer 1 is turned off.

The ASIC 15 is connected to the motor 102 and the carriage motor 103. The ASIC 15 supplies drive currents to the motor 102 and carriage motor 103 via drive circuits (not shown). The motor 102 and carriage motor 103 are DC motors that rotate faster when supplied with a larger drive current and slower when supplied with a smaller drive current. The controller 10 controls the rotations of the motor 102 and carriage motor 103 through pulse width modulation (PWM) control, for example.

The controller 10 also applies drive voltages to the piezoelectric elements 321 in the recording head 32 to eject ink droplets from nozzles 33. The ASIC 15 is also connected to the registration sensor 120, encoder 121, encoder 122, and carriage encoder 123. The controller 10 detects states of the inkjet printer 1 based on signals outputted from the registration sensor 120, encoder 121, encoder 122, and carriage encoder 123.

Specifically, the controller 10 detects whether sheets P have passed a position of contact with the conveying roller 60 based on the detection signal outputted from the registration sensor 120. The controller 10 also detects the rotated amount of the conveying roller 60 based on pulse signals outputted from the encoder 121 and detects the rotated amount of the feed roller 21 based on pulse signals outputted from the encoder 122. The controller 10 also estimates the position of a sheet P along the conveying path R based on the pulse signals outputted from the encoder 121 after an ON signal has been outputted from the registration sensor 120.

The controller 10 detects the position of the carriage 31 in the width direction of the sheet P based on an encoder signal inputted from the carriage encoder 123. The controller 10 functions as an ejection detecting unit for detecting when ink ejection from the recording head 32 in a recording process is complete. Specifically, the controller 10 acquires print data and detects whether ink ejection is complete based on the acquired print data and the detected position of the carriage 31.

When recording an image on the sheet P, the controller 10 ejects ink from nozzles 33 in the recording head 32 while moving the carriage 31 along the width direction of the sheet P in a state where conveyance of the sheet P is in a halted state. The controller 10 controls the carriage 31 and recording head 32 to repeatedly alternate between a recording process for recording one line worth of an image on the sheet P by ejecting ink, and a line feed process for driving the conveying roller 60 and discharge roller 62 to convey the sheet P a prescribed feed amount.

The operating panel 41 is connected to the ASIC 15. The user can input operational commands for the printer section into the operating panel 41, as well as print settings, such as the size of the sheet P and the resolution of the recorded image. The size and resolution are stored in the RAM 13 via the ASIC 15 and bus 16 as size information and resolution information, respectively.

An interface 40 is also connected to the ASIC 15. The controller 10 can exchange data with external information devices via the interface 40. An external information device is a computer, for example, on which a printer driver has been installed. Thus, the paper size and image resolution for controlling the printer section may be inputted into the operating panel 41 or from the printer driver on an external information device.

<Principles of Inducing Electromotive Force in the Coil 70>

In the present embodiment, an electromotive force is induced in the coil 70 when the coil 70 is interlinked with magnetic fluxes generated by magnets 721. This electromotive force is used as drive voltage for the recording head 32.

Figure 3:
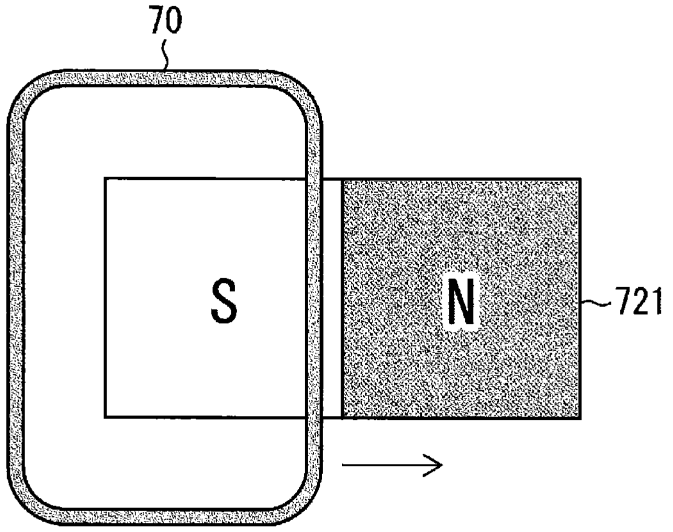
FIG. 3 is a view illustrating the layout of a magnet and a coil used in the inkjet printer.

FIG. 3 shows the principles of electromotive force induced in the coil 70.

The coil 70 is moved over the magnet 721 in the direction of the arrow in FIG. 3. Since the magnet 721 produces magnetic flux in a space from the N-pole toward the S-pole, the coil 70 by moving becomes interlinked with magnetic flux in this space. According to Faraday's law, electromotive force is generated across the terminals of the coil 70.

This electromotive force induced in the coil 70 is used for driving piezoelectric elements 321 provided in the recording head 32 to eject ink from nozzles 33.

Figure 4:
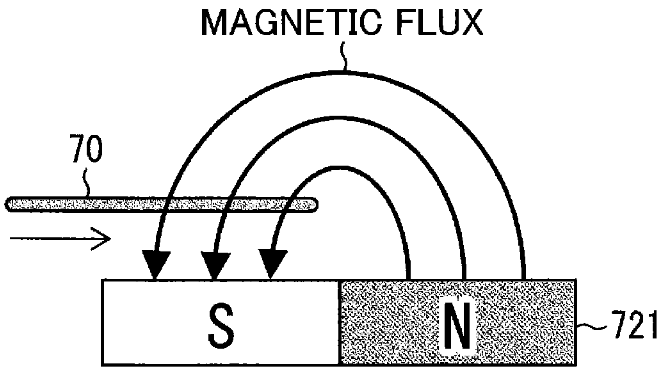
FIG. 4 is a view illustrating interlinkage of the coil with magnet flux of the magnet.
Figure 5:
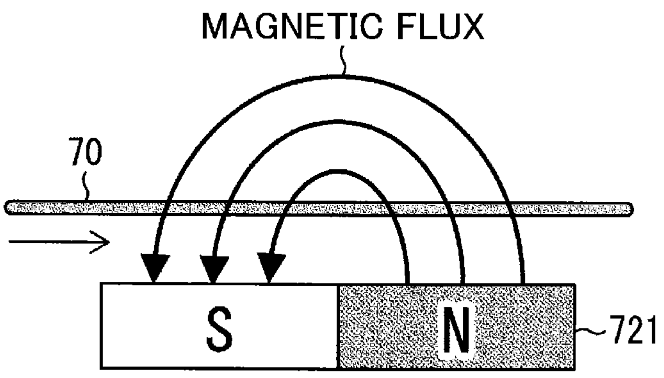
FIG. 5 is another view illustrating interlinkage of the coil with magnet flux of the magnet.

FIGS. 4 and 5 show a sample layout of the coil 70 and a magnet 721. FIG. 4 shows a case in which the coil 70 has a shorter length in the moving direction of the carriage 31 than the length of the magnet 721 in the same direction. FIG. 5 shows a case in which the length in the moving direction of the coil 70 is greater than that of the magnet 721. In the following description, the term "length" used in relation to the coil 70 and magnet 721 will refer to their lengths in the moving direction of the carriage 31.

When the length of the magnet 721 is greater than the length of the coil 70, as in the example of FIG. 4, a large electromotive force can be induced since the change in magnetic flux through the moving coil 70 is large. However, when the length of the magnet 721 is shorter than the length of the coil 70, as in the example of FIG. 5, only a small electromotive force can be obtained since magnetic fluxes through the moving coil 70 cancel each other out. Consequently, a larger electromotive force can be obtained when the magnet 721 is longer than the coil 70.

<Layout of the Carriage 31 and the Magnet Array 72>

Figure 6:
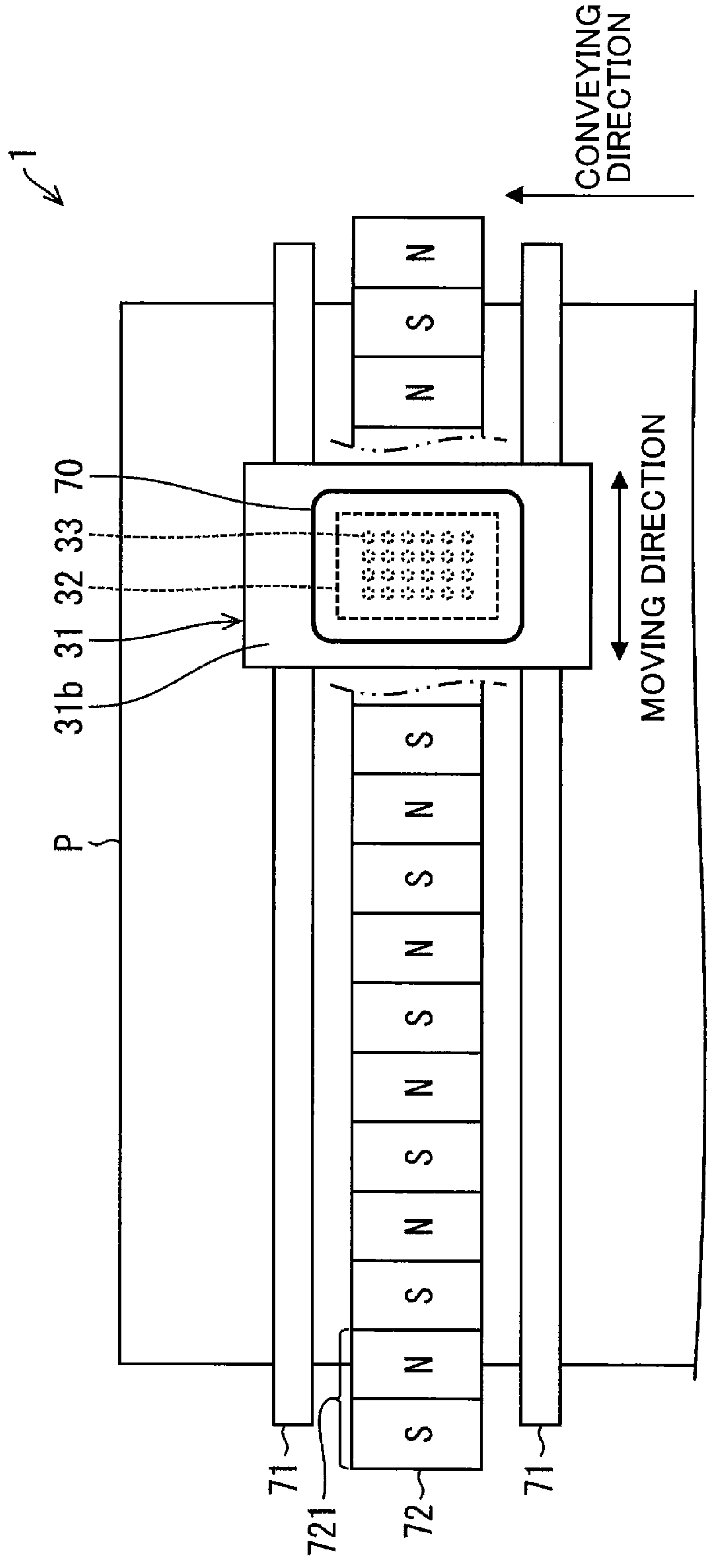
FIG. 6 is a plan view illustrating the positional relationship between a magnet array and a carriage in the inkjet printer.
Figure 7:
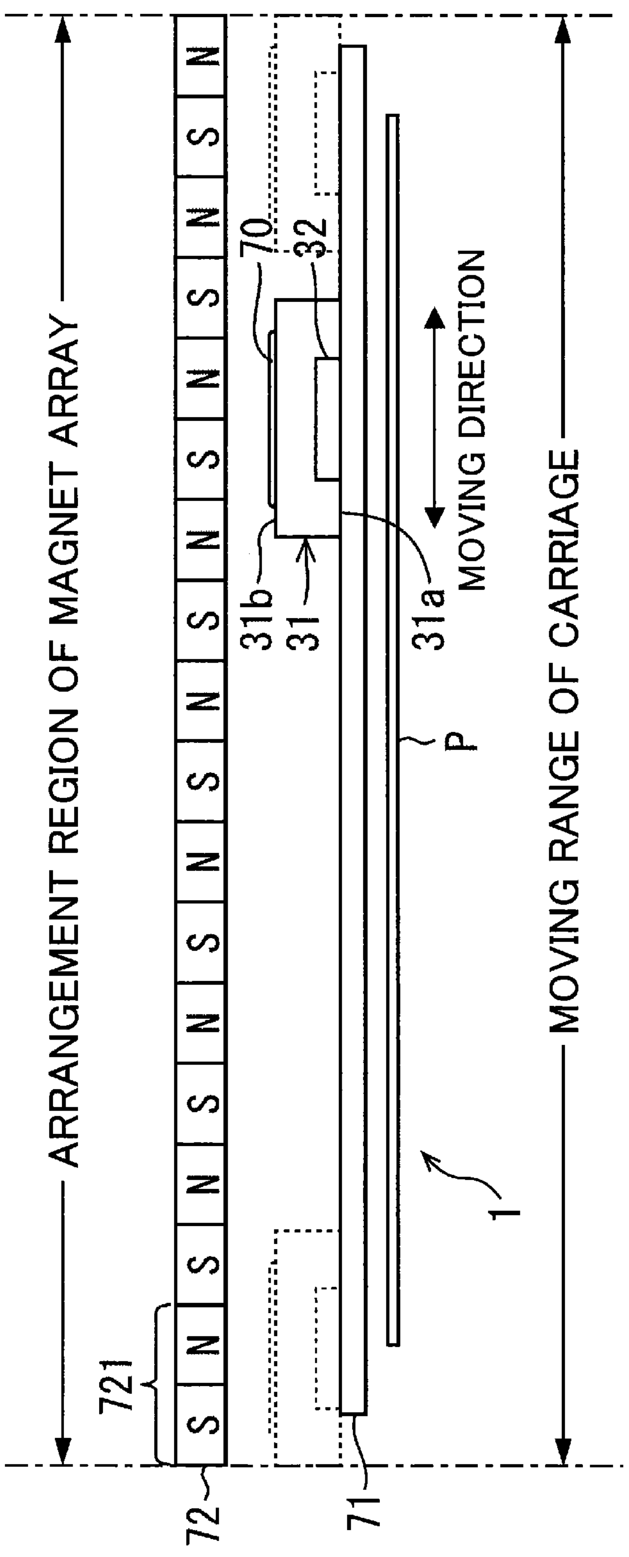
FIG. 7 is a front view illustrating the positional relationship between the magnet array and the carriage.

FIG. 6 is a plan view showing the positional relationship of the carriage 31 and magnet array 72. FIG. 7 is a front view showing the positional relationship of the carriage 31 and magnet array 72. As described in FIG. 1, the inkjet printer 1 includes the metal guides 71, as well as the magnet array 72.

The two metal guides 71 are arranged parallel and spaced apart from each other. The metal guides 71 extend along the moving direction of the carriage 31. While not shown in the drawings, the carriage 31 is engaged with the metal guides 71 so as to be slidable on the metal guides 71. When driven by the carriage motor 103, the carriage 31 slidingly moves on the metal guides 71.

The recording head 32 and coil 70 are mounted in the carriage 31. When the carriage 31 moves along the moving direction, the recording head 32 and coil 70 move along the moving direction together with the carriage 31.

The carriage 31 has a head arrangement surface 31*a* and a coil arrangement surface 31*b*. The head arrangement surface 31*a* and coil arrangement surface 31*b* are horizontal surfaces, and the coil arrangement surface 31*b* is the top surface of the carriage 31. The head arrangement surface 31*a* and coil arrangement surface 31*b* are different surfaces of the carriage 31. The recording head 32 is arranged on the head arrangement surface 31*a*, and the coil 70 is arranged on the coil arrangement surface 31*b*. Note that the coil 70 may be disposed in the interior of the carriage 31 at a position near the coil arrangement surface 31*b*.

Since the head arrangement surface 31*a* and coil arrangement surface 31*b* are different surfaces, the coil 70 can be arranged in the carriage 31 without being limited by the layout position of the recording head 32. Accordingly, the coil 70 can be formed at the maximum size determined by the size of the coil arrangement surface 31*b* on the carriage 31. Forming the coil 70 at the maximum size in this way can improve power generating efficiency.

The coil 70 moves in the moving direction of the carriage 31 along with the movement of the carriage 31. Through this movement, the coil 70 generates electromotive force by interlinking with magnetic fluxes generated by the magnet array 72. As will be described later, a drive voltage for driving piezoelectric elements 321 in the recording head 32 is generated using the electromotive force induced in the coil 70.

The magnet array 72 includes a plurality of the magnets 721. The magnets 721 are connected and arranged in a row parallel to the moving direction of the carriage 31 and above the carriage 31, i.e., above the coil 70. Note that the magnet array 72 may be disposed beneath the carriage 31 instead.

If the coil 70 were to be disposed on the side surface of the carriage 31, the carriage 31 would have to be formed with a height corresponding to the size of the coil 70 since the coil 70 needs to be formed at a prescribed size. However, when the coil 70 is disposed on a horizontal surface of the carriage 31, the carriage 31 can be formed with a low height since the height of the carriage 31 is not governed by the size of the coil 70 in this case. Therefore, the carriage 31 can be made more compact. Further, by arranging the magnet array 72 above or below the coil 70, strong magnet fluxes produced from the magnet array 72 easily interlink with the coil 70 from above or below, thereby improving power generating efficiency.

Unlike the area beneath the carriage 31 through which the sheet P passes, normally there are no obstacles above the carriage 31. Thus, by disposing the coil 70 on the top surface of the carriage 31, the coil 70 can be arranged in close proximity to the magnet array 72 disposed above the coil 70. This structure enables the coil 70 to pass through areas of strong magnetic flux generated by the magnets 721 in the magnet array 72, producing a large electromotive force. Therefore, power generating efficiency can be improved.

Further, the magnet array 72 is arranged over a region including the entire moving range of the carriage 31. That is, as illustrated in FIG. 7, the region in which the magnet array 72 is arranged, i.e., the arrangement region of the magnet array 72 covers the entire moving range of the carriage 31. More specifically, the arrangement region of the magnet array 72 is overlapped with at least the entire moving range of the carriage 31 as viewed from the above (as viewed in the vertical direction). This structure enables the coil 70 to generate electric power across the entire moving range of the carriage 31. Therefore, this configuration has better power generating efficiency than a configuration in which the magnet array 72 is arranged over only a portion of the moving range of the carriage 31. Note that, in the present embodiment, the arrangement region of the magnet array 72 is equivalent to the moving range of the carriage 31. Alternatively, the arrangement region of the magnet array 72 may be greater than the moving range of the carriage 31. In this case, for example, the both ends of the arrangement region of the magnet array 72 is located outside the moving range of the carriage 31 in the moving direction.

Here, the length of each magnet 721 is set larger than the length of the coil 70, as described above. Hence, power generating efficiency is improved since the configuration reduces cancelling magnetic fluxes among the magnetic fluxes interlinked with the coil 70.

In the bottom surface of the recording head 32, the nozzles 33 are arranged in a matrix configuration and spaced apart from one another at prescribed intervals. The area of the coil arrangement region of the coil arrangement surface 31*b* in which region the coil 70 is arranged is greater than the area of the nozzle arrangement region of the head arrangement surface 31*a* in which region the nozzles 33 are arranged.

In the recording head 32, the area occupied by the nozzle arrangement region is large. Thus, the size of the recording head 32 is determined by the area of the nozzle arrangement region. Further, the size of the carriage 31 is determined according to the size of the recording head 32, and also the area of the coil arrangement region is determined by the size of the recording head 32. Hence, by setting the area of the coil arrangement region greater than the area of the nozzle arrangement region that occupies a large area on the head arrangement surface 31*a* of the carriage 31, the coil 70 can be formed larger, enabling an improvement in power generating efficiency.

<Detailed Configuration of the Recording Head 32 and Control Configurations of the Carriage 31 and Recording Head 32>

Figure 8:
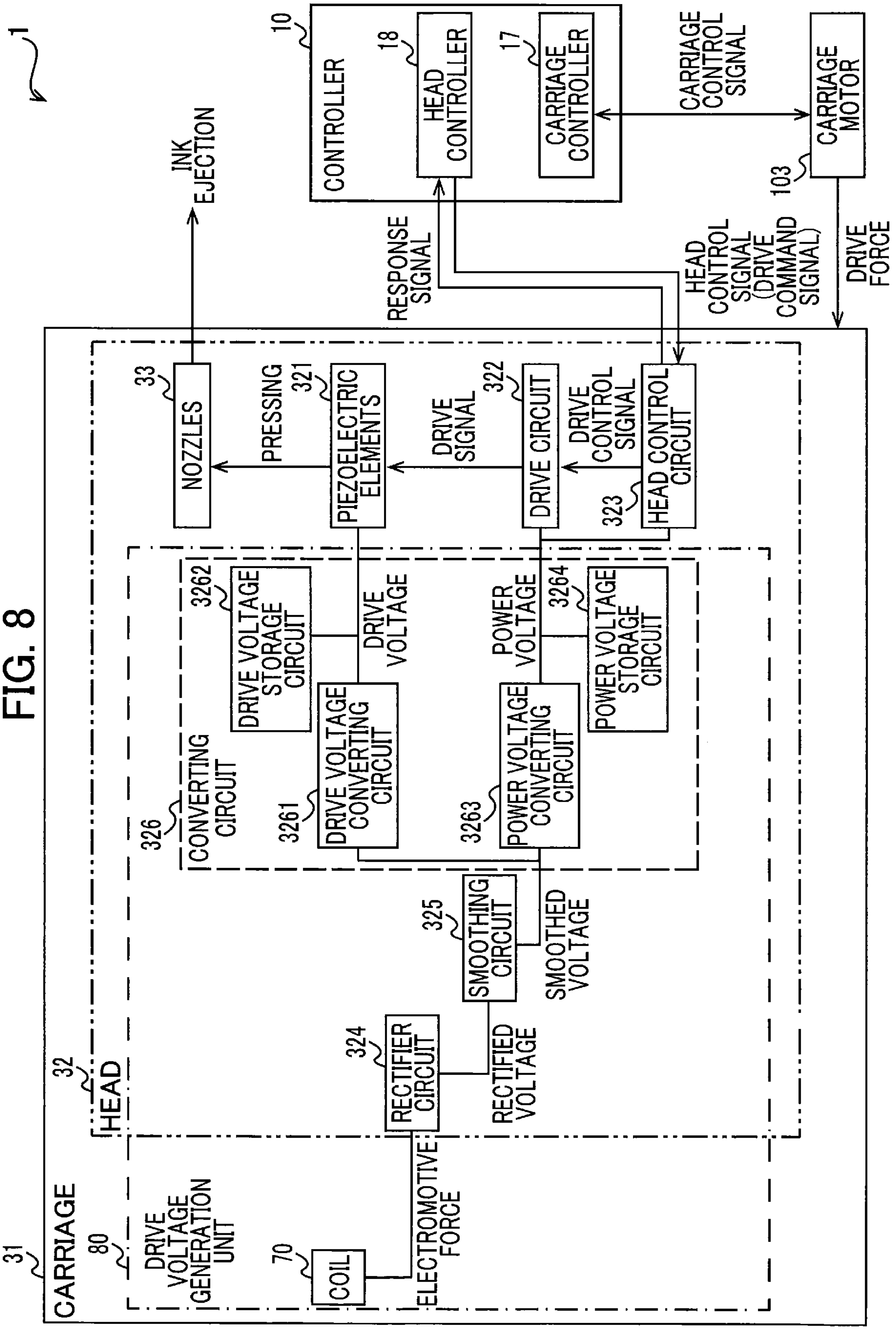
FIG. 8 is a block diagram illustrating a detailed configuration of a head provided on the carriage.

FIG. 8 is a block diagram showing the configuration of the recording head 32 in detail. The recording head 32 is provided with a rectifier circuit 324, a smoothing circuit 325, a converting circuit 326, the piezoelectric elements 321, a drive circuit 322, a head control circuit 323, and the nozzles 33. The converting circuit 326 includes a drive voltage converting circuit 3261, a drive voltage storage circuit 3262, a power voltage converting circuit 3263, and a power voltage storage circuit 3264. The controller 10 includes a carriage controller 17, and a head controller 18.

The coil 70, rectifier circuit 324, smoothing circuit 325, and converting circuit 326 constitute a drive voltage generation unit 80.

The rectifier circuit 324 includes a bridge rectifier circuit. When an AC electromotive force is induced by movement of the carriage 31, the rectifier circuit 324 rectifies an AC voltage generated by the induced AC electromotive force, converting the AC voltage to a positive rectified voltage.

The smoothing circuit 325 smooths the rectified voltage to convert the same to a smoothed voltage. The smoothing circuit 325 includes a smoothing capacitor.

The converting circuit 326 converts the smoothed voltage to a drive voltage for driving piezoelectric elements 321. The converting circuit 326 also converts the smoothed voltage to a power supply voltage for both the drive circuit 322 and the head control circuit 323. In the present embodiment, the drive voltage is from 30 to 33 V, for example, and the power supply voltage is 3.3 V, for example.

As described above, the converting circuit 326 includes the drive voltage storage circuit 3262 that stores power using the drive voltage, and the power voltage storage circuit 3264 that stores power using the power supply voltage. If a drive voltage sufficient for driving the piezoelectric elements 321 is not obtained from electromotive force in the coil 70, the drive voltage storage circuit 3262 applies the drive voltage to the piezoelectric elements 321 in place of the coil 70. When a power supply voltage is not obtained from electromotive force in the coil 70, the power voltage storage circuit

3264 applies a power supply voltage to the drive circuit 322 and head control circuit 323 in place of the coil 70.

Note that the converting circuit 326 need not necessarily include the drive voltage storage circuit 3262 and power voltage storage circuit 3264, but these storage circuits may be omitted from the converting circuit 326.

The head control circuit 323 controls the drive circuit 322 by outputting a drive control signal to the drive circuit 322.

The drive circuit 322 generates a drive signal based on the drive control signal received from the head control circuit 323. The drive circuit 322 drives the piezoelectric elements 321 by outputting drive signals to the piezoelectric elements 321.

The drive signals outputted by the drive circuit 322 deform the piezoelectric bodies in the corresponding piezoelectric elements 321, pressurizing ink to eject ink droplets from the corresponding nozzles 33.

The head controller 18 outputs a head control signal to the head control circuit 323. The head control signal includes data, such as a printing pattern, a drive command signal, and the like. The drive command signal is a signal providing a command for driving the recording head 32. In other words, the drive command is a signal providing a drive command for driving the piezoelectric elements 321. The drive command includes a print command for ejecting ink from the nozzles 33 to print an image on a sheet P, and a maintenance command for removing ink clogging of the nozzles 33. In response to receiving a response signal from the head control circuit 323 as a response to the drive command signal, the head controller 18 recognizes that the recording head 32 is operational for printing operations, i.e., that the recording head 32 is ready for printing operations.

The carriage controller 17 controls the carriage motor 103 by outputting a carriage control signal to the same. The carriage controller 17 moves the carriage 31 at least over the entire region in which the magnet array 72 is arranged. The carriage motor 103 moves the carriage 31 based on the carriage control signal.

The drive voltage generation unit 80 having the configuration described above generates a drive voltage using electromotive force induced in the coil 70 by movement of the carriage 31, and applies the generated drive voltage to the piezoelectric elements to drive the same. In this configuration, excess load torque required for generating the drive voltage to be applied to the piezoelectric elements 321 need not be produced in the carriage motor 103. Hence, power-saving can be achieved in the inkjet printer 1.

The drive voltage that is suitable for driving the piezoelectric elements 321 can be obtained from electromotive force induced in the coil 70 by virtue of the rectifier circuit 324, smoothing circuit 325, and converting circuit 326.

Electromotive force induced in the coil 70 when the amount of movement of the carriage 31 is small may not be sufficient for driving the piezoelectric elements 321. However, by storing electric power in the drive voltage storage circuit 3262 and power voltage storage circuit 3264 primarily when the amount of movement of the carriage 31 is large, the drive voltage generation unit 80 can obtain a sufficient drive voltage for driving the piezoelectric elements 321, even when the amount of movement of the carriage 31 is small.

As illustrated in FIG. 7, the carriage controller 17 moves the carriage 31 at least over the entire region in which the magnet array 72 is arranged, i.e., the entire arrangement region of the magnet array 72. That is, the moving range of the carriage 31 covers at least the entire arrangement region of the magnet array 72. More specifically, the moving range of the carriage 31 is overlapped with at least the entire arrangement region of the magnet array 72 as viewed from the above (as viewed in the vertical direction). Not that, the carriage 31 indicated by the dashed line on the right side in FIG. 7 shows one end position (the rightmost position in the present embodiment) of the moving range of the carriage 31 in the moving direction, while the carriage 31 indicated by the dashed line on the left side in FIG. 7 shows the other end position (the leftmost position in the present embodiment) of the moving range of the carriage 31 in the moving direction. Thus, more electric power can be stored in the drive voltage storage circuit 3262 and power voltage storage circuit 3264 than if the carriage 31 were moved only through a portion of the region in which the magnet array 72 is arranged, thereby improving power generating efficiency. Note that, in the present embodiment, the moving range of the carriage 31 is equivalent to the arrangement region of the magnet array 72. Alternatively, the moving range of the carriage 31 may be greater than the arrangement region of the magnet array 72. In this case, for example, the both end positions of the moving range of the carriage 31 is located outside the arrangement region of the magnet array 72 in the moving direction.

<Printing Process on the Inkjet Printer 1>

Figure 9:
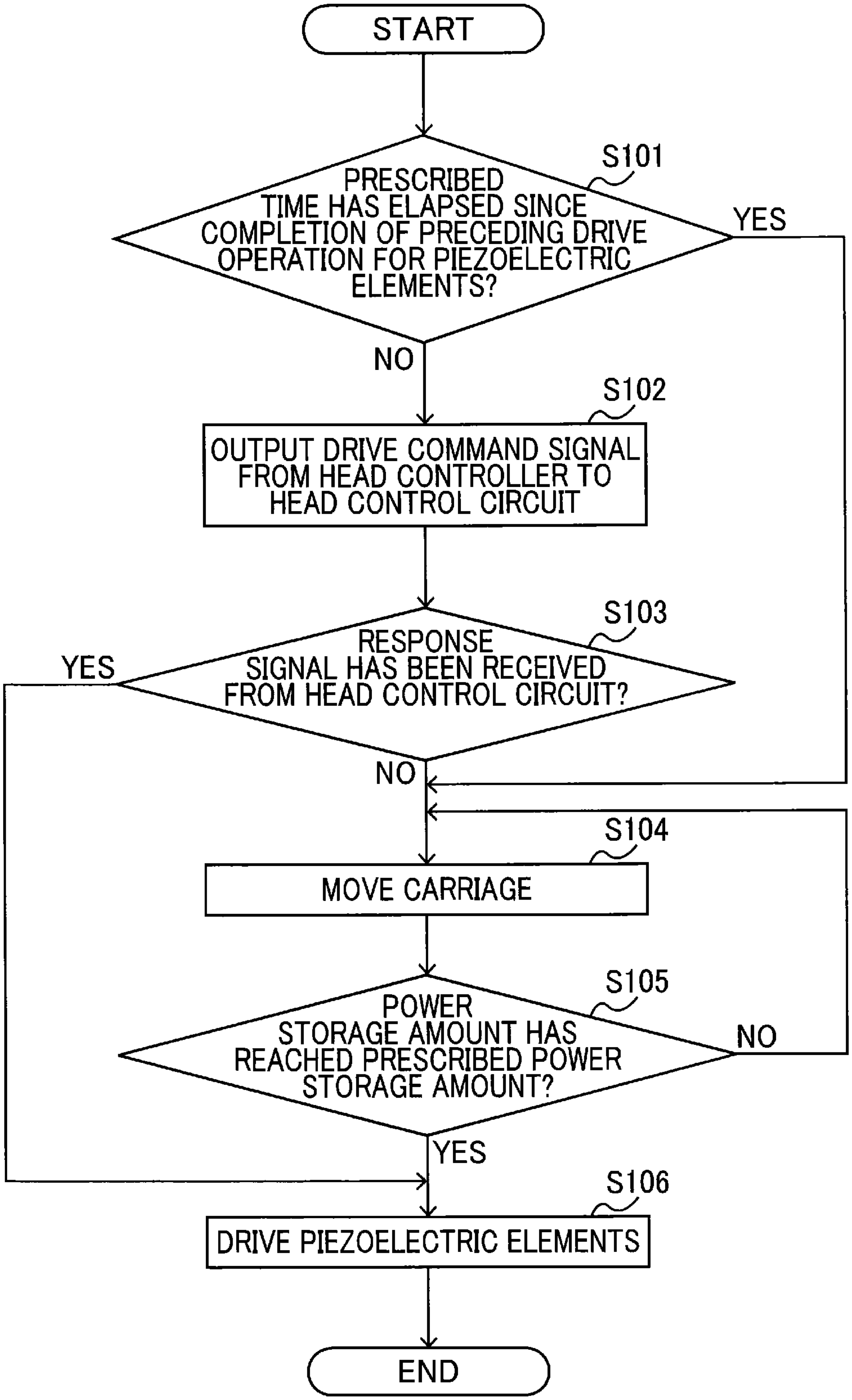
FIG. 9 is a flowchart illustrating steps in a printing process performed in the inkjet printer.

Next, a printing process performed on the inkjet printer 1 will be described. FIG. 9 is a flowchart showing steps in the printing process.

To start the process in FIG. 9, the user inputs a print command to the inkjet printer 1. In response to the print command, the inkjet printer 1 generates the drive command.

In S101 of FIG. 9, the carriage controller 17 determines whether a prescribed period of time has elapsed since the immediately preceding drive operation for the piezoelectric elements 321 was completed. The process advances to S104 if the prescribed period of time has elapsed since completion of the immediately preceding drive operation (S101: YES) and advances to S102 in all other cases (S101: NO).

If the prescribed period of time has not elapsed (S101: NO), the carriage controller 17 determines that each of the drive voltage storage circuit 3262 and power voltage storage circuit 3264 (hereinafter simply called the "storage circuits") stores electric power of a corresponding prescribed value or greater. In this case, there is no need to move the carriage 31. However, if the prescribed period of time has elapsed (S101: YES), it is likely that each of the storage circuits no longer stores electric power of the corresponding prescribed value or greater due to discharge. In this case, it is necessary to move the carriage 31 in order to store electric power in the storage circuits.

In S102 the head controller 18 outputs a drive command signal to the head control circuit 323.

In S103 the head controller 18 determines whether a response signal has been received from the head control circuit 323. The process advances to S106 if a response signal has been received (S103: YES) and advances to S104 in all other cases (S103: NO).

In S104 the carriage controller 17 outputs a carriage control signal to the carriage motor 103 to move the carriage 31 in the moving direction.

In S105 the carriage controller 17 determines whether electric power stored in each of the storage circuits has reached the corresponding prescribed value (i.e., prescribed storage amount). The process advances to S106 when the prescribed value has been achieved (S105: YES) and returns to S104 in all other cases (S105: NO).

In S106 the head controller 18 begins a drive operation for driving the piezoelectric elements 321.

After the drive operation for the piezoelectric elements 321 is completed, the process of FIG. 9 ends.

As described above, when the head controller 18 receives a response signal from the head control circuit 323 (S103: YES), the carriage controller 17 deems that each of the storage circuits stores electric power of the corresponding prescribed value or greater. In this case, the carriage controller 17 does not move the carriage 31. However, when a response signal is not received from the head control circuit 323 (S103: NO), the carriage controller 17 deems that each of the storage circuits does not store sufficient electric power. In this case, the carriage controller 17 moves the carriage 31.

In this way, the carriage 31 is not moved when each of the storage circuits stores electric power of at least the corresponding prescribed value. Thus, this configuration avoids moving the carriage 31 unnecessarily every time a drive command is issued, enabling drive operations for the piezoelectric elements 321 to be started quickly.

In the above-described embodiment, the carriage controller 17 moves the carriage 31 when the head controller 18 has not received a response signal from the head control circuit 323. Alternatively, the carriage controller 17 may move the carriage 31 at the time point that the head controller 18 outputs a drive command signal.

In this way, in response to the issuance of a drive command, the carriage controller 17 moves the carriage 31 before the piezoelectric elements 321 are driven. As a result, before the piezoelectric elements 321 are driven, the storage circuits store electric power using the drive voltage obtained from electromotive force induced in the coil 70. Thus, even in a case where the storage circuits do not store sufficient power for driving the piezoelectric elements 321 when a drive command is issued, sufficient power for driving the piezoelectric elements 321 can be stored in the storage circuits through the movement of the carriage 31.

If the prescribed period of time used in the determination of S101 is set to the period of time required for the maximum electric power stored in the storage circuits to fall below the prescribed value due to self-discharge, each of the storage circuits can be assumed to store electric power greater than or equal to the corresponding prescribed value if the period of time from the end of the immediately preceding drive operation for the piezoelectric elements 321 to the issuance of a drive command for the current drive operation falls within the prescribed time. Conversely, if the period of time from the end of the immediately preceding drive operation for the piezoelectric elements 321 to the issuance of a drive command for the current drive operation is not within the prescribed period of time, the storage circuits do not store sufficient electric power for the recording head 32 to respond. In this case, each of the storage circuits may be assumed not to store electric power greater than or equal to the corresponding prescribed value.

Through this process, the controller 10 can infer whether each of the storage circuits stores electric power greater than or equal to the corresponding prescribed value without measuring the electric power actually stored in the storage circuits.

Here, the drive command may be a print command for executing a printing operation. In this way, the storage circuits can store electric power for driving the piezoelectric elements 321 at least when executing a printing operation.

<Implementation Through Software>

The functions of the inkjet printer 1 (hereinafter called "the device") may be implemented through a program for controlling a computer to function as the device or a program for controlling the computer to function as the controller 10 of the device.

In this case, the device is provided with, as the hardware for executing the program, a computer having at least one control device (a processor, for example) and at least one storage device (memory, for example). By executing the program with the control device and storage device, each function described in the embodiment can be implemented.

The program may be stored in one or more non-transitory computer-readable storage media. The device may be provided with the one or more storage media or not. In the latter case, the program may be supplied to the device through any wired or wireless transmission medium.

Further, all or some of the functions in each control block described above may be implemented with logic circuits. For example, an integrated circuit on which are formed logic circuits functioning as the control blocks described above falls within the scope of the present disclosure. Furthermore, the functions of each control block may be implemented by a quantum computer, for example.

While the description has been made in detail with reference to the embodiment, it would be apparent to those skilled in the art that many modifications and variations may be made thereto. There also falls within the scope of the present disclosure an embodiment obtained by appropriately combining technical elements disclosed in each of the embodiment and its variations.

What is claimed is:

1. An inkjet printer comprising:
- a head including:
  - a nozzle; and
  - an ejection element configured to be driven, when applied with a drive voltage, to pressurize ink and eject the ink from the nozzle;
- a drive voltage generating circuit configured to generate the drive voltage to be applied to the ejection element;
- a carriage configured to move in a moving direction to move the head and the drive voltage generating circuit in the moving direction; and
- a magnet array including a plurality of magnets arrayed in the moving direction,
- wherein the drive voltage generating circuit includes a coil configured to produce an electromotive force by interlining with magnetic flux of the magnet array in accordance with movement of the carriage, and
- wherein the drive voltage generating circuit generates the drive voltage using the electromotive force produced by the coil.

2. The inkjet printer according to claim 1,
- wherein the drive voltage generating circuit further includes:
  - a rectifier circuit configured to rectify an AC voltage generated by the electromotive force produced by the coil into a rectified voltage;
  - a smoothing circuit configured to smooth the rectified voltage into a smoothed voltage; and
  - a converting circuit configured to convert the smoothed voltage into the drive voltage.

3. The inkjet printer according to claim 2,
- wherein the converting circuit includes a power storage circuit configured to store electric power using the drive voltage.

4. The inkjet printer according to claim 3, further comprising:

a carriage controller configured to perform:

moving, in a case where a drive command for driving the ejection element is issued, the carriage before the ejection element is driven.

5. The inkjet printer according to claim 4, wherein the moving is performed in a case where the electric power stored in the power storage circuit is less than a prescribed value when the drive command is issued, and wherein the moving is not performed in a case where the electric power stored in the power storage circuit is equal to or greater than the prescribed value when the drive command is issued.

6. The inkjet printer according to claim 5, wherein the carriage controller is further configured to perform:

determining, in a case where a period of time from a time when an immediately preceding operation for driving the ejection element is completed to a time when the drive command is issued is equal to or shorter than a prescribed period of time, that the electric power stored in the power storage circuit is equal to or greater than the prescribed value.

7. The inkjet printer according to claim 4, wherein, in the moving, the carriage controller moves the carriage at least over an entire region where the magnet array is arranged.

8. The inkjet printer according to claim 4, wherein the drive command is a print command for executing a printing operation.

9. The inkjet printer according to claim 1, wherein the magnet array is arranged over a region including an entire moving range of the carriage.

10. The inkjet printer according to claim 1, wherein a length of the magnet in the moving direction is longer than a length of the coil in the moving direction.

11. The inkjet printer according to claim 1, wherein the carriage has a head arrangement surface on which the head is arranged and a coil arrangement surface on which the coil is arranged, the head arrangement surface and the coil arrangement surface being different surfaces.

12. The inkjet printer according to claim 1, wherein the coil is arranged at a horizontal surface of the carriage, and wherein the magnet array is arranged above or below the coil.

13. The inkjet printer according to claim 12, wherein the horizontal surface is defined at a top surface of the carriage, and wherein the magnet array is arranged above the coil.

14. The inkjet printer according to claim 1, wherein the head includes a plurality of the nozzles, and wherein a coil arrangement region of the carriage where the coil is arranged is greater than a nozzle arrangement region of the head where the plurality of the nozzles is arranged.

15. The inkjet printer according to claim 1, wherein the ejection element is a piezoelectric element.

* * * * *